June 24, 1930.  J. S. JACKSON  1,766,385
INTERNAL COMBUSTION ENGINE
Filed Dec. 29, 1928   7 Sheets-Sheet 1

Inventor
John S. Jackson
By W. W. Williamson

June 24, 1930. J. S. JACKSON 1,766,385
INTERNAL COMBUSTION ENGINE
Filed Dec. 29, 1928 7 Sheets-Sheet 6

Inventor
John S. Jackson
By W. W. Williamson

June 24, 1930.  J. S. JACKSON  1,766,385
INTERNAL COMBUSTION ENGINE
Filed Dec. 29, 1928  7 Sheets-Sheet 7
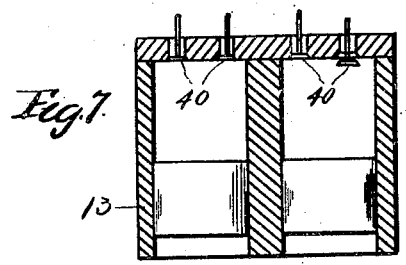
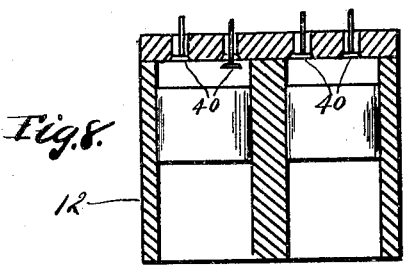
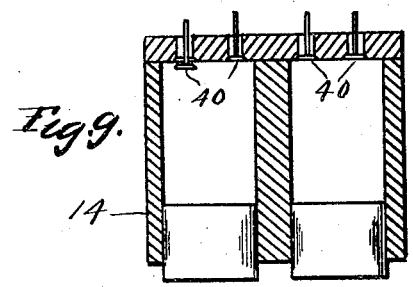
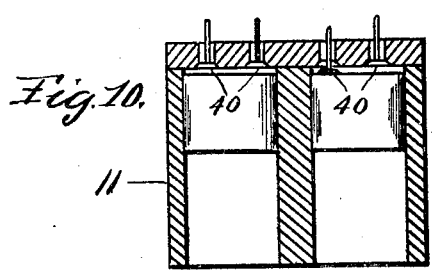
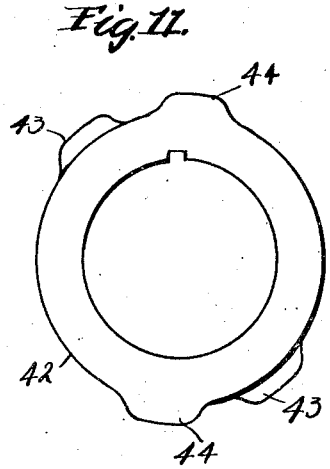
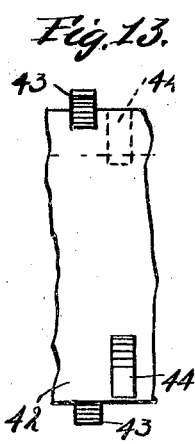
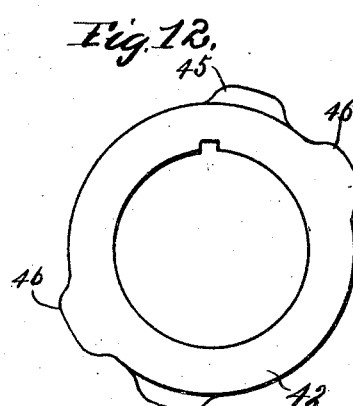
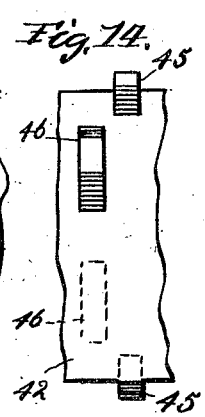
Inventor
John S. Jackson
By W. W. Williamson
Atty.

Patented June 24, 1930

1,766,385

UNITED STATES PATENT OFFICE

JOHN S. JACKSON, OF PHILADELPHIA, PENNSYLVANIA

INTERNAL-COMBUSTION ENGINE

Application filed December 29, 1928. Serial No. 329,295.

My invention relates to new and useful improvements in internal combustion engines and the like, and has for its object to so design and construct such an engine as to provide for the transmission of power from a series of reciprocatory pistons to the rotatable power shaft by successive pulls upon said shaft through the medium of levers acting upon an internal cam wheel, thereby eliminating dead center firing, greatly increasing efficiency and largely eliminating friction in the transmission of power from the pistons to the power shaft.

A further object of my invention is to provide for the return or reverse stroke of the pistons through the action of a cam wheel carried by the power shaft.

A further object of the invention is to provide for the actuation of the valve mechanism of the piston cylinders from cams carried directly by the power shaft, thus eliminating counter shafts and gear wheels.

A further important object of this invention is to so construct the power cam wheel and its actuating mechanism as to cause an increase of leverage upon said wheel during the pull thereon simultaneously with the decrease of pressure upon the pistons caused by the progressive expansion of the motor fluid.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:

Figs. 7, 8, 9 and 10 are diagrams showing the positions of the valves and pistons in one of the twin cylinders during a complete cycle of its operation.

Fig. 11 is a side view of the cam hub showing the cam projection thereon for effecting the inlet and exhaust of one series of the twin cylinders.

Fig. 12 is a view similar to Fig. 11, showing the cam projection thereon for effecting the inlet and exhaust of the other series of twin cylinders.

Figs. 13 and 14 are face views of Figs. 11 and 12, respectively.

Figure 1:
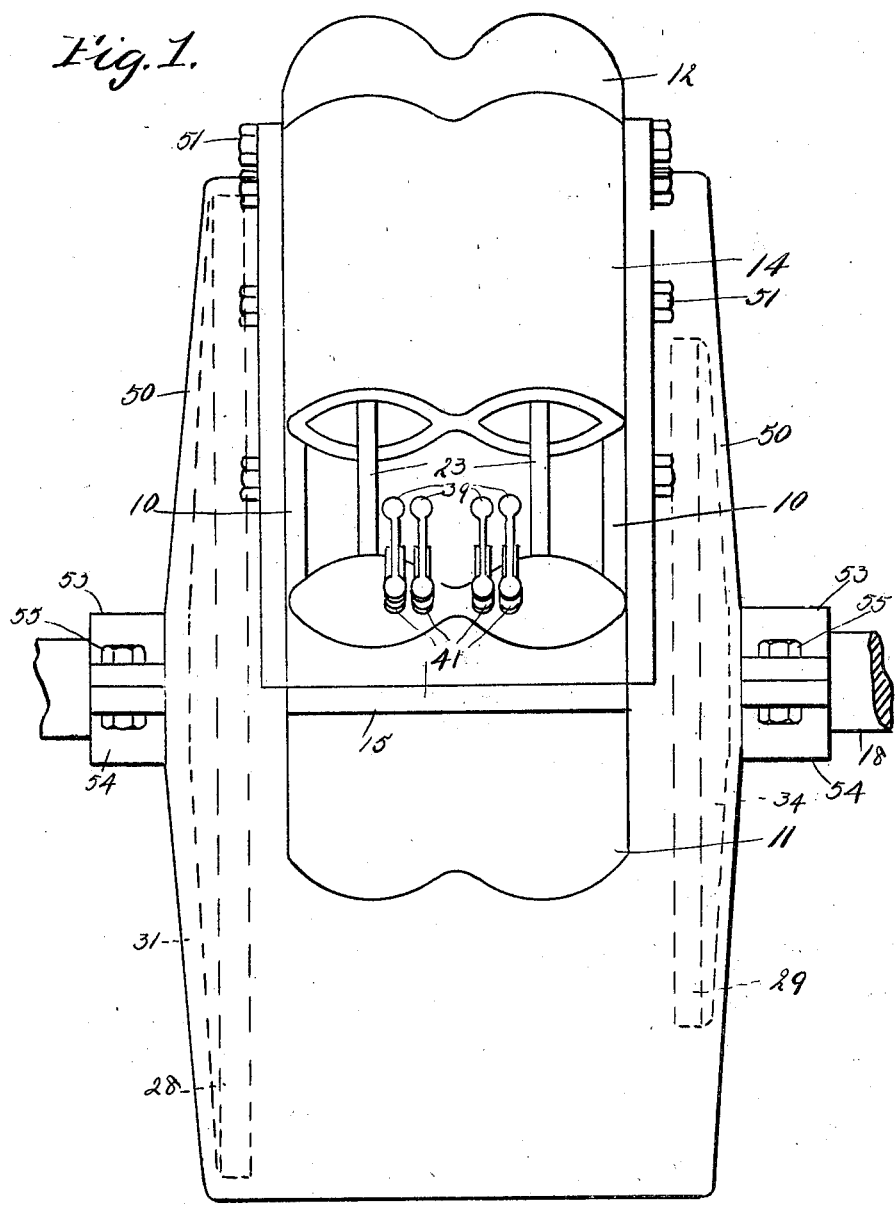
Fig. 1 is a front elevation of the engine.
Figure 2:
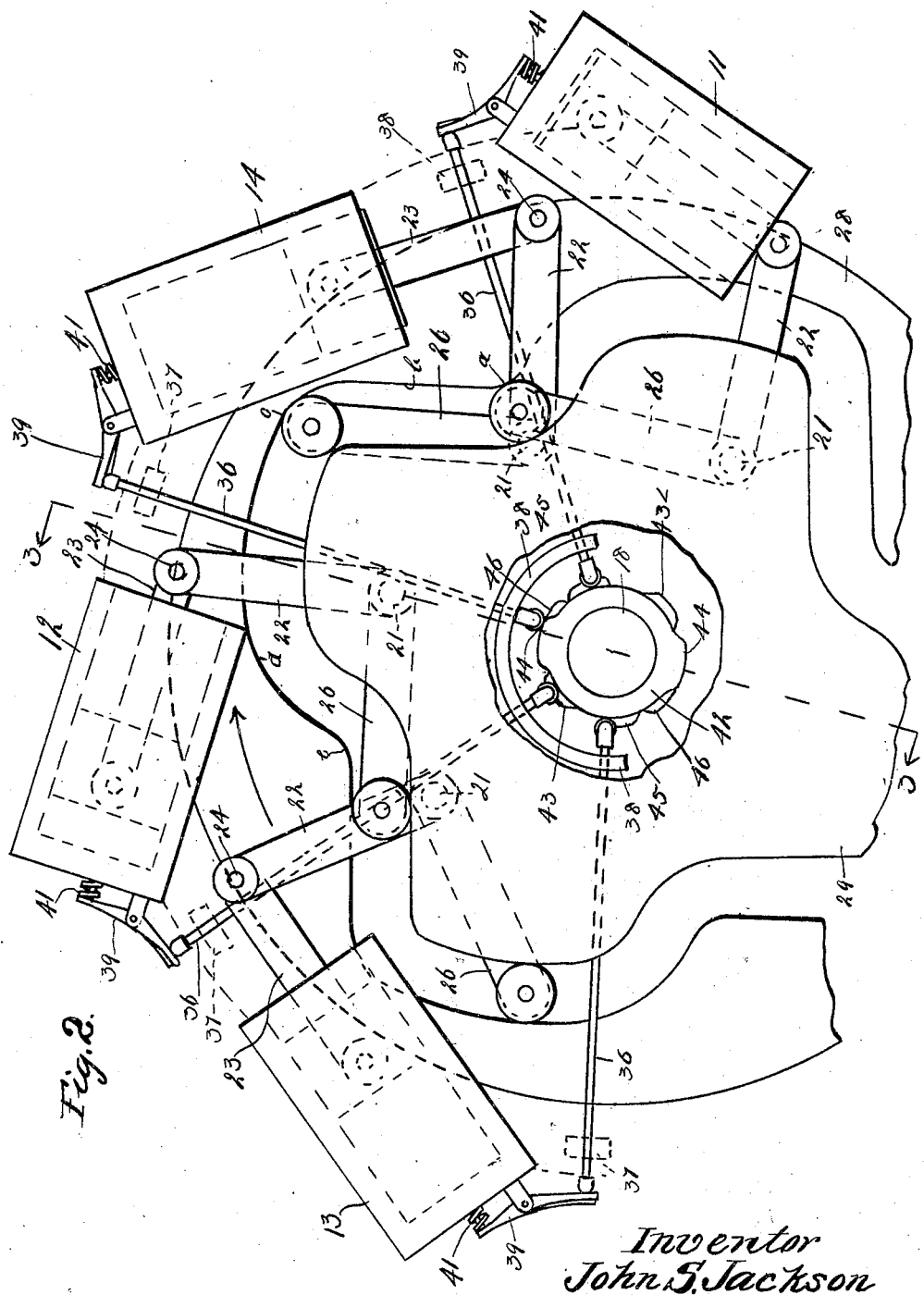
Fig. 2 is a diagrammatical elevation showing the cam wheels, cylinders and actuating mechanism, a portion of said cam wheels being broken away.
Figure 3:
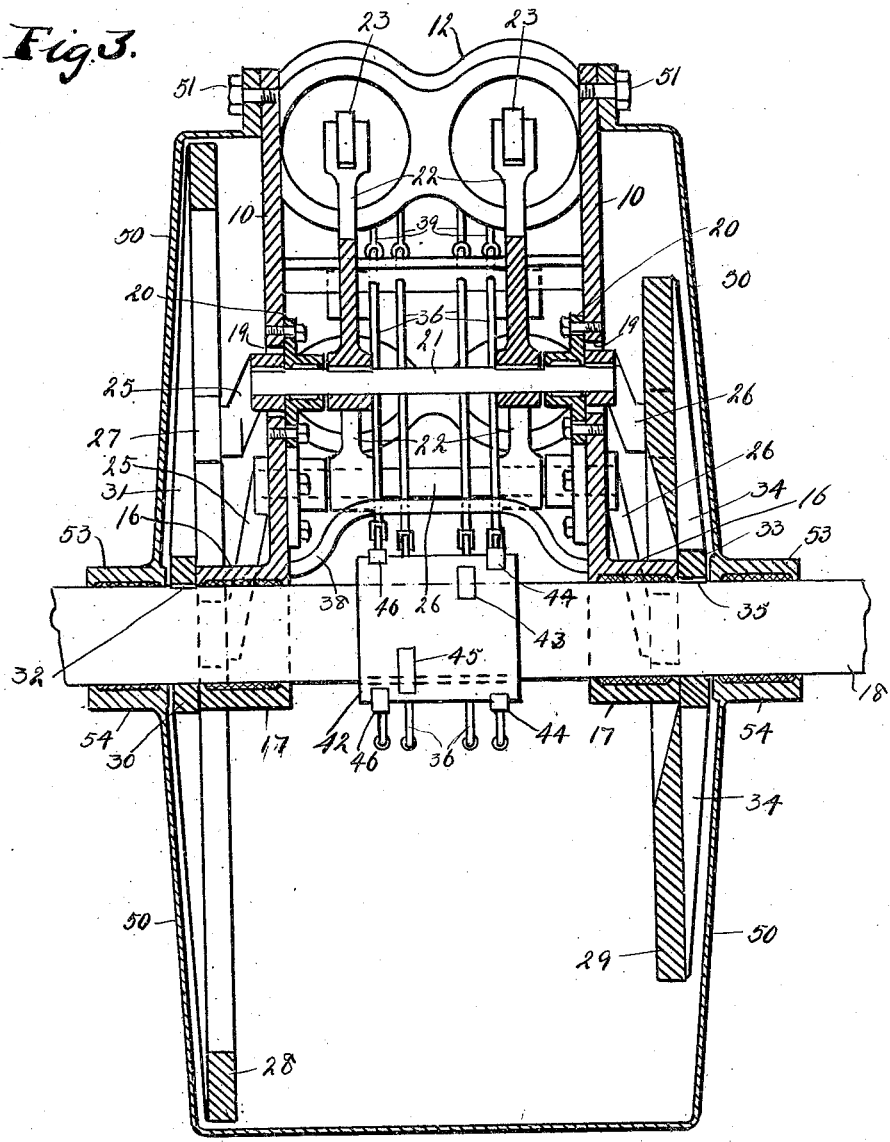
Fig. 3 is a section of the engine taken on the line 3—3 of Fig. 2.
Figure 4:
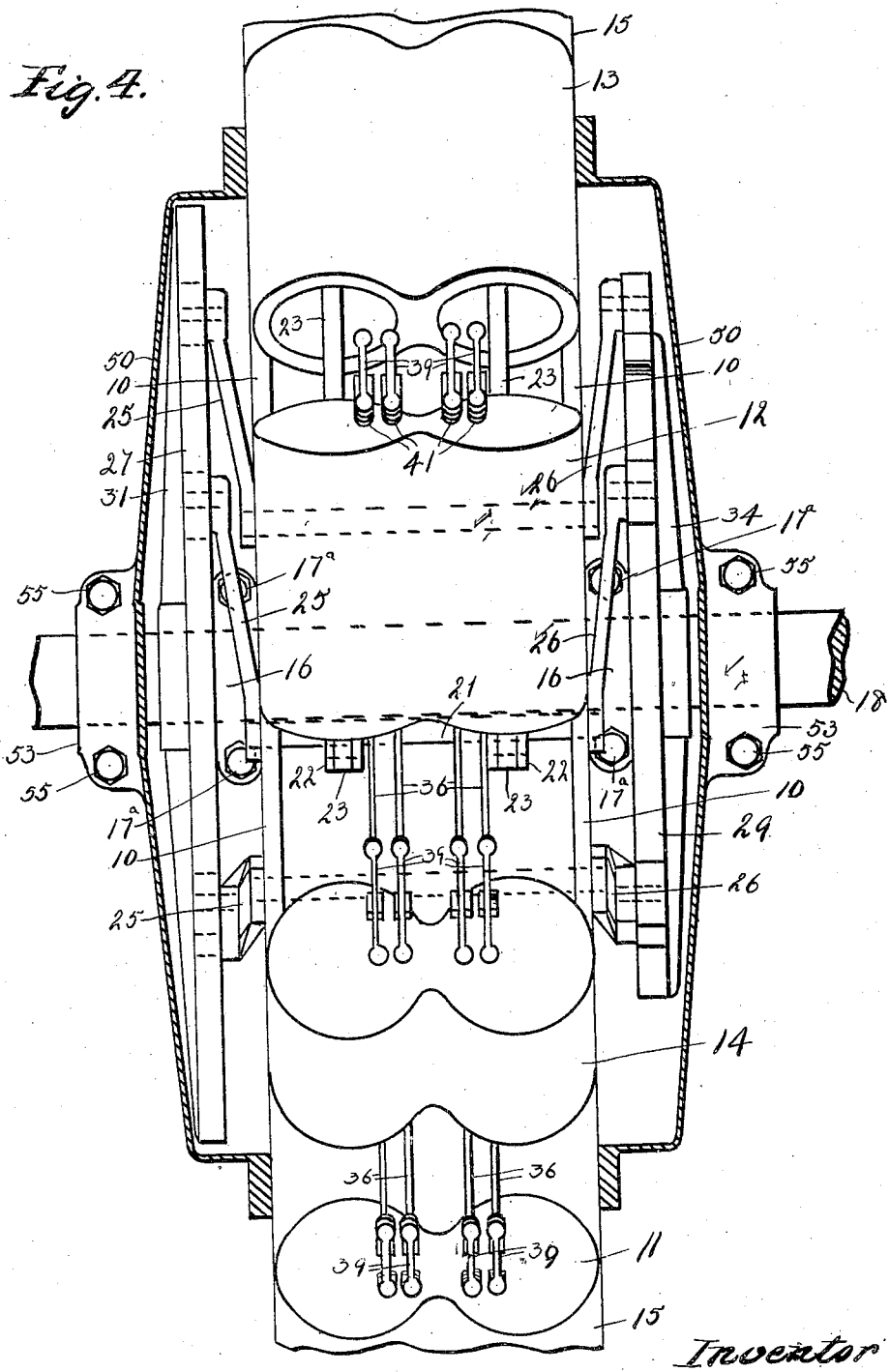
Fig. 4 is a plan view, the upper portion of the enclosing casing being sectioned away to show the parts therein.
Figure 5:
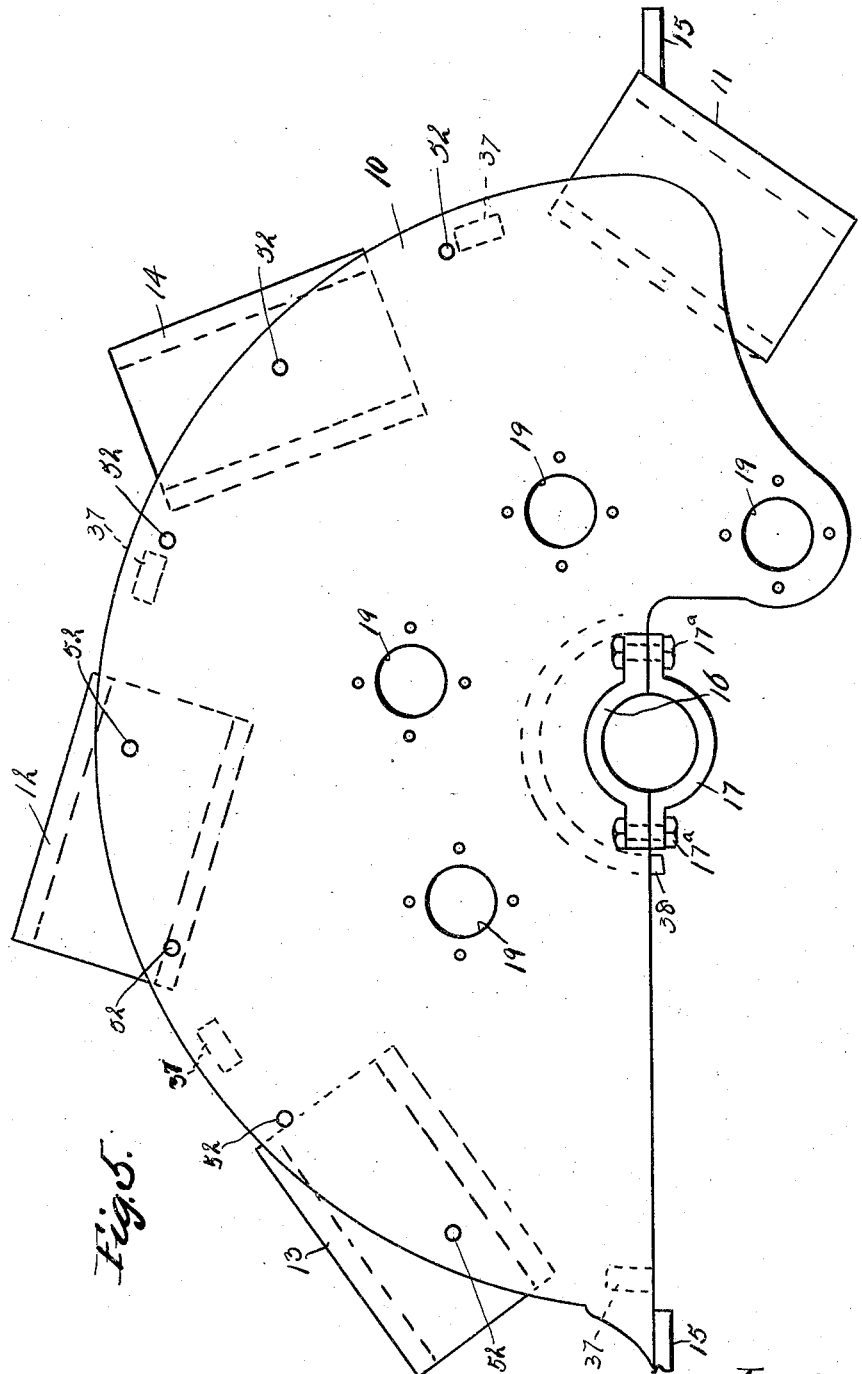
Fig. 5 is a side elevation of the cylinder frame, showing the cylinders carried thereby.
Figure 6:
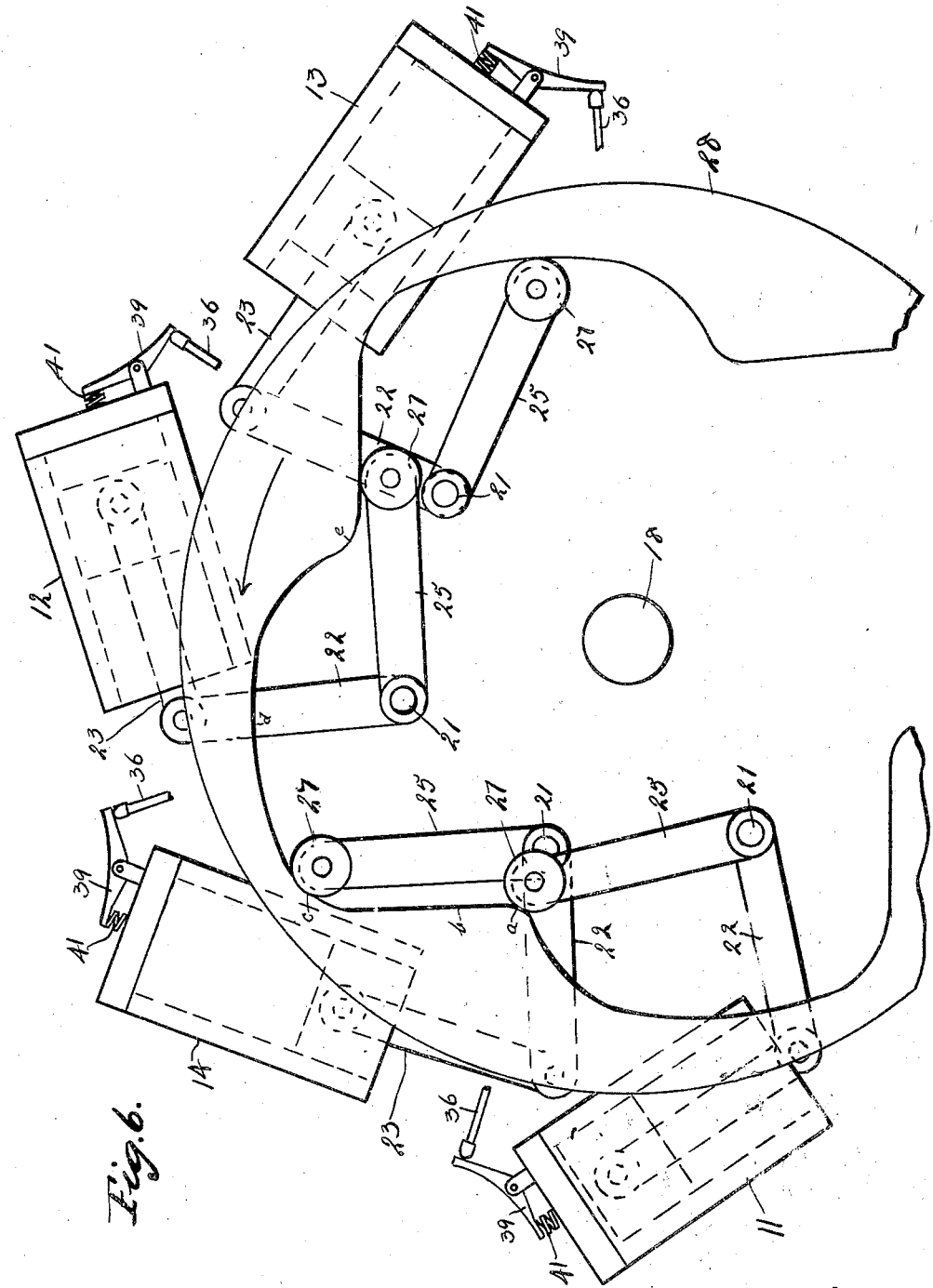
Fig. 6 is a diagrammatical view showing the power cam taken on the opposite side from Fig. 2, and also showing the relative location of the cylinders and actuating mechanism.

In carrying out my invention as herein embodied, 10 represents the frame of the engine having mounted thereon the twin cylinders 11, 12, 13 and 14, and is provided with flanges 15, for seating the frame upon and swing it to an automobile chassis or other support. This frame consists of two semi-circular plates having the shaft bearings 16 formed therewith to which the caps 17 are secured by the bolts 17ª for returning the power shaft 18 in place.

Suitable openings 19 are formed in the two plates of the frame 10 over which are bolted the bearing blocks 20 in which latter are journalled the rock-shafts 21, and upon each of these shafts are keyed two power levers 22, each of the latter being connected at its outer end to one of the piston rods 23 of twin cylinders as at 24.

On the outer ends of the rock-shafts are keyed the actuating levers 25 and the retrieving levers 26, the actuating levers carrying the rolls 27 at their outer ends, which rolls are adapted to act upon the cam surface of the internal actuating cam wheel 28, while the retrieving levers 26 carry similar rolls for contacting with the retrieving cam wheel 29.

The cam wheel 28 has a hub 30 connecting therewith by the ribs 31 and this hub is keyed to the power shaft 18 as at 32, and the cam wheel 29 also has a hub 33 connected thereto by the ribs 34 and this last named hub is also keyed to the power shaft 18 as at 35; thus the power developed upon the pistons will be transmitted to the internal cam wheel 28 and the rotation of the cam wheel 29 will give the pistons their backward strokes when the engine is idling or running by momentum without firing.

36 indicates the valve rods which are mounted to slide in the bearings 37 and 38 carried by the frame 10 so as to be properly guided and the outer ends of these rods contact with the valve levers 39 to operate the valves 40 against the action of the springs 41.

42 represents a cam hub keyed upon the power shaft 18, this hub carrying the cam projections 43 for actuating the inlet valve rods of the right hand cylinders and the cam projection 44 for actuating the exhaust valve rods of the same cylinders; also carrying the cam projections 45, for actuating the inlet valve rods of the left hand cylinders and the cam projection 46 for actuating the exhaust valve rods of these last named cylinders.

From the foregoing description, the operation of the engine will be as follows:—

Assuming that the left hand cylinder 11 has its charge compressed and ready to fire, the roll of the corresponding actuating lever will be at the point $a$, so that when this cylinder is fired, this roll will act upon the power cam surface $b$ from $a$ to $c$, giving a power pull to the cam wheel 28 in the direction of the arrow marked thereon, and the right hand piston being coupled to the same rock-shaft will be drawn outward to accomplish the intake in the right hand cylinder. The continued revolving of the cam wheel 28 will cause the cam surface $d$ to swing the actuating lever in a reverse direction, returning the left hand piston upon its exhaust stroke, and the right hand piston on its compression stroke, which action takes place from the point $c$ to the point $e$.

The further rotation of this cam wheel will bring the following cam surface in position to be acted upon by the roll of the same power lever to effect a continued transmission of power, thus completing the cycle of this cylinder.

While this cycle is being accomplished in the pair of cylinders just described, a similar cycle is taking place in the other pairs of cylinders.

There being four of these left hand cylinders in the construction here shown, it is to be noted that while the cylinder 11 is firing, cyling 14 is discharging, cylinder 12 is taking in gas and cylinder 13 is compressing the charge, so that cylinder 13 will be next to fire. While these operations are taking place in the left hand cylinders, the right hand cylinders are functioning through a like cycle, the cylinder 12 having fired and being part way on its power stroke at the time the left hand cylinder 11 is on the point of firing; at which time the right hand cylinder 13 is exhausting; right hand 11 is on its intake and right hand 14 is compressing and will therefore be the next right hand cylinder to fire.

The cam projections 43 are so set as to properly time the inlet action of the valves of the left hand cylinders and the cam projections 44 are likewise set to properly time the exhaust valves of these cylinders; also the cam projections 46 are likewise timed to properly effect the inlet action of the right hand cylinders and the cam projections 45, the exhaust thereof.

It will be understood that when the engine is idling, the cam wheel 29 will keep the rolls of the actuating levers in running contact with the cam surfaces of the internal cam wheel 28.

As before stated, an important object of this invention is to increase the leverage of the applied power during the decrease of pressure upon the pistons which will be readily seen is accomplished by the set of the power cam surface $b$ relative to the swing of the actuating levers 26.

In the ordinary four-cycle internal combustion engine, there is a power stroke in each cylinder, for each second revolution of the power shaft, whereas in my improved engine there are two power strokes in each cylinder for each revolution, thereby especially adapting this engine to certain classes of work, as for instance, automobiles and the like.

While I have not here shown an ignition system or fuel supply, it is obvious that any suitably timed ignition and properly arranged supply will serve the purpose.

In order that the working parts may be properly housed and protected or may operate in oil, I provide the casing 50, which is preferably made in sections, the two upper sections being secured by the bolts 51 threaded into the bolt holes 52 to the engine frame 10, and these sections have formed therewith the half bearings 53 for fitting over the power shaft 18 while the lower section of the casing also has formed therewith the half bearings 54 which fit around the lower half of the power shaft and these half bearings are secured together by the bolts 55 which arrangement holds the lower half of the casing in place. As will be seen, this casing not only serves to enclose the working parts of the engine and act as a grease receptacle, but when made of sufficient strength adds materially to the support of the power shaft in the form of secondary bearings.

Of course I do not wish to be limited to the exact details of construction as herein shown, as these may be varied within the limits of the claims, as for instance, the number of cylinders may be increased or decreased, and the stroke of the pistons increased or decreased by simply lengthening or shortening the power levers; this can also be accomplished by the proper change of the cam surfaces; also by an increase of the diameter of the motor, the power leverage will be multiplied.

Having described my invention, what I claim as new and useful is:—

1. In an internal combustion engine, a rotary member having internal cam surfaces, and means for transmitting power from the pistons of said engine to said rotary member by successive outward pulls upon said cam surfaces.

2. In an engine of the character described, a rotary member having a series of internal cam surfaces, a power lever for thrusting outward upon said cam surfaces, a cylinder, a reciprocating piston within said cylinder, and means for transmitting the reciprocations of the piston to the power lever.

3. In an engine of the character described, a rotary member having a series of cam surfaces formed within its periphery, an actuating lever adapted to act upon certain of said surfaces and be acted upon by certain other of said cam surfaces, a piston fitted to slide in a suitable cylinder, and a power lever connecting the piston with the actuating lever in such manner that the power stroke of said piston will transmit an outward pull upon certain of said cam surfaces and the compression stroke of said piston will be brought about by the action of certain of said cam surfaces upon the actuating lever.

4. In an engine of the character described, an internal cam wheel, a power shaft upon which said wheel is secured, an external cam wheel also secured upon said shaft, a series of cylinders, pistons fitted to reciprocate in said cylinders, a series of rock-shafts, power levers carried by said rock-shafts and connected with the piston rods, and a series of actuating levers also secured upon the rock-shafts and so arranged relative to the cam surfaces of the internal cam wheel as to transmit outward thrusts upon certain of the cam surfaces of said wheel upon the firing strokes of the pistons and to be acted upon by certain other of the cam surfaces of said internal cam wheel for giving the pistons their compression strokes, said external cam wheel being adapted to act upon the power levers to give the pistons their exhaust strokes, said last named cam wheel also serving to maintain the power levers in proper relation to the cam surfaces of the internal cam.

5. In an internal combustion engine, a frame for supporting the operating parts of said engine, a power shaft journalled in said frame, a series of twin cylinders carried by the frame, a series of rock-shafts also journaled on the frame, a series of power levers secured to the rock-shafts, said power levers being connected to the piston rods of said cylinders, an internal cam wheel secured upon the power shaft, an external cam wheel also secured upon said power shaft, a series of actuating levers secured upon the rock-shafts and adapted to thrust outward upon the cam surfaces of the internal cam wheel to be pulled inward by certain of the cam surfaces upon the last named wheel, a second series of actuating levers also secured upon the rock-shafts and adapted to be moved outward by the cam surfaces of the external cam wheel, and a cam hub carrying a series of cam projections for bringing about the proper movements of the valves of the cylinders.

6. In an internal combustion engine, a frame consisting of two plates spaced apart, a power shaft journalled in said frame, rock-shafts also journalled in the frame, a series of twin cylinders mounted upon the frame, pistons slidable in said cylinders, piston rods carried by the pistons, two series of power secured upon the rock-shafts, each of said series being connected with the piston rods of one side of the twin cylinders, an internal cam wheel secured upon the power shaft, a series of actuating levers secured to the rock-shafts and adapted to have an outward thrust upon certain surfaces of said cam wheel and be given an inward pull by certain other surfaces of said cam wheel, an external cam also secured upon the power shaft, a second series of actuating levers secured to the rock-shafts and adapted to be swung outward by certain of the cam surfaces upon said external cam wheel, and means carried by the power shaft for actuating the valves of the cylinders.

7. An internal combustion engine, a series of twin cylinders having reciprocating pistons, two series of power levers, each series being connected with the cylinders of one side of the twins, rock-shafts upon which both series of power levers are secured, an internal cam wheel secured upon the power shaft, means for revolving said cam wheel by the actuation of the rock-shafts and an external cam wheel also secured upon the power shaft, and means for actuating the rock shafts from the last named cam.

8. In an engine of the character described, a series of cylinders in pairs, the pistons of each pair of cylinders being coupled together so as to move in unison in such manner that the exhaust stroke of one of said pistons takes place during the compression stroke of the piston of the other cylinder of the pair and the firing stroke of one piston bring about the stroke of the other piston.

9. In an engine of the character described, a pair of cylinders having reciprocating pistons, the latter being so coupled together as to move inward together and outward together, and means for transmitting power from these pistons to a power shaft by an outward pull.

10. In an engine of the character described, a series of cylinders arranged in pairs, pistons carried by the cylinders, a rock-shaft for each pair of cylinders, means for connecting the pistons of each pair of cylinders to one of the rock-shafts in such manner as to cause both pistons of each pair to move in the same direction simultaneously, an internal cam wheel and means for transmitting power from the rock-shafts to the cam wheel by successive outward thrusts upon said cam wheel.

11. The structure set forth in claim 10 in combination with a retrieving cam and means for oscillating the rock-shafts from said retrieving cam.

In testimony whereof, I have hereunto affixed my signature.

JOHN S. JACKSON.